United States Patent [19]

Poggio et al.

[11] Patent Number: 5,774,129
[45] Date of Patent: Jun. 30, 1998

[54] IMAGE ANALYSIS AND SYNTHESIS NETWORKS USING SHAPE AND TEXTURE INFORMATION

[75] Inventors: Tomaso Poggio, Wellesley; David Beymer; Michael Jones, both of Cambridge, all of Mass.; Thomas Vetter, Tübingen, Germany

[73] Assignee: Massachusetts Institute of Technology, Cambridge, Mass.

[21] Appl. No.: 486,637

[22] Filed: Jun. 7, 1995

[51] Int. Cl.[6] .................................................. G06F 15/00
[52] U.S. Cl. ........................................................... 345/441
[58] Field of Search ........................................ 395/141, 118, 395/100, 142, 119, 143, 135

[56] References Cited

U.S. PATENT DOCUMENTS 5,375,195  12/1994  Johnston ................................. 395/135
5,432,864  7/1995   Lu et al. ................................. 382/118
5,465,308  11/1995  Hutcheson et al. ..................... 382/159
5,497,430  3/1996   Sadovnik et al. ....................... 382/156

Primary Examiner—Phu K. Nguyen
Attorney, Agent, or Firm—Fenwick & West LLP

[57] ABSTRACT

An image processing system (100) analyzes novel images in one of three modes. In a first mode, the system learns a model based on prototype images, and uses the model to characterize the shape of a novel image as a pixel-by-pixel linear combination of the prototypes. In a second mode, both shape and texture are used to characterize the novel image as a linear combination of the prototypes. In a third mode, shape information is modeled by a linear combination of prototypes and texture information is modeled by an optical flow, and processing of shape and texture information is interleaved. Novel images are synthesized by analysis of input images using transformed prototypes.

10 Claims, 9 Drawing Sheets

IMAGE ANALYSIS AND SYNTHESIS NETWORKS USING SHAPE AND TEXTURE INFORMATION

SUBJECT INVENTION

The present invention is a subject invention under contracts N00014-91-J-0385 and N00014-92-J-1879 with the United States Government, and as such the United States Government has rights therein.

FIELD OF THE INVENTION

The present invention relates generally to image analysis and synthesis using artificial intelligence, and specifically to a system and method for analyzing and synthesizing images using networks that are sensitive to shape and texture information.

DESCRIPTION OF BACKGROUND ART

Numerous schemes have been proposed to detect, recognize, and synthesize target images. The task of detection involves determining whether a target image is present in an input image. The task of recognition involves determining whether a detected target image matches one of a set of model images. The task of synthesis involves creating a target image based on certain desired characteristics or parameters of the target image.

The example of human face detection, recognition and synthesis is of considerable practical importance. For example, numerous applications could benefit from automatic determination of whether a photograph (or video frame or other image) contains a human face and, if so, whose face it is.

Face recognition has similarly been approached using a variety of techniques. The techniques of recent interest include methods based on "Principal Component Analysis" or "PCA" for extracting a small number of parameters from the whole of an image. Such parameters may then be used to characterize, recognize, and reconstruct facial images.

Typically, such recognition techniques require that all of the images under consideration be geometrically normalized so that facial features line up across all images. Commonly, a global transform, e.g., a similarity or affine transform, is used to align two or three major facial features such as the eyes or the eyes and the mouth.

Unfortunately, there is enough variability in human faces that just aligning a few features often leaves other features significantly misaligned. Such misalignment complicates subsequent processing and reduces the effectiveness of other techniques for recognition or reconstruction.

Two fundamental characteristics of facial images that may be employed for recognition-related processing are geometry, or "shape," and gray level information, or "texture." Most prior PCA approaches confound texture and shape by not geometrically normalizing images at a fine level of detail, such as at the pixel level. Therefore, some recent approaches involve decoupling texture and shape information. For instance, in one approach shape is represented separately from texture, and the shape of a particular image relative to a "standard shape" image is used as the basis of normalizing texture by mapping texture information to the standard shape image, with the resulting texture information being "shape-free."

No effective automatic method has been demonstrated for taking advantage of the shape and texture information in images such as faces.

Synthesis of human faces has traditionally involved many of the same considerations as detection and recognition. For example, an input face may be recognized by determining some metric from the input face to each of a set of model faces, and by interpolating among the models to achieve a reconstruction of the input face. Because the task of face synthesis is undertaken using techniques similar to those involved in detection and recognition, some of the same difficulties arise.

Accordingly, there remains a need for an improved system and method that can be used for detecting, characterizing, recognizing, and synthesizing images using shape and texture information.

DISCLOSURE OF INVENTION

In accordance with the present invention, a system (100) for image analysis and synthesis uses a shape engine (106) to process shape-related information and a texture engine (108) to process texture-related information. In short, the system (100) "vectorizes" an input image, i.e., establishes pixelwise correspondences between the input image and a set of prototype images.

In one aspect of the invention, the shape engine (106) defines a shape model based on prototypes applied to shape engine, and then uses the shape model to approximate the shape of a novel image as a weighted combination of the shapes of the prototypes.

In another aspect of the invention, the shape engine (106) and the texture engine (108) define shape and texture models based on prototypes applied to the shape and texture engines, and then uses the shape and texture models to approximate the shape and texture of a novel image as a weighted combination of the shapes and textures of the prototypes.

In still another aspect of the invention, the shape engine and the texture engine operate iteratively to approximate the shape of a novel image as pixelwise optical flow correspondences between the novel image and a reference image derived from the prototypes and the texture of a novel image as a weighted combination of the prototype textures.

In another aspect of the invention, a novel image is synthesized from an applied image by modifying image parameters through combinations of shapes and textures of prototypes corresponding to a desired transformation.

The features and advantages described in the specification are not allinclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BEST MODE FOR CARRYING OUT THE INVENTION

The figures depict a preferred embodiment of the present invention for purposes of illustration only. Those skilled in the art will readily recognize from the following discussion that alternative embodiments of the structures and methods illustrated herein may be employed without departing from the principles of the invention described herein.

Figure 1:
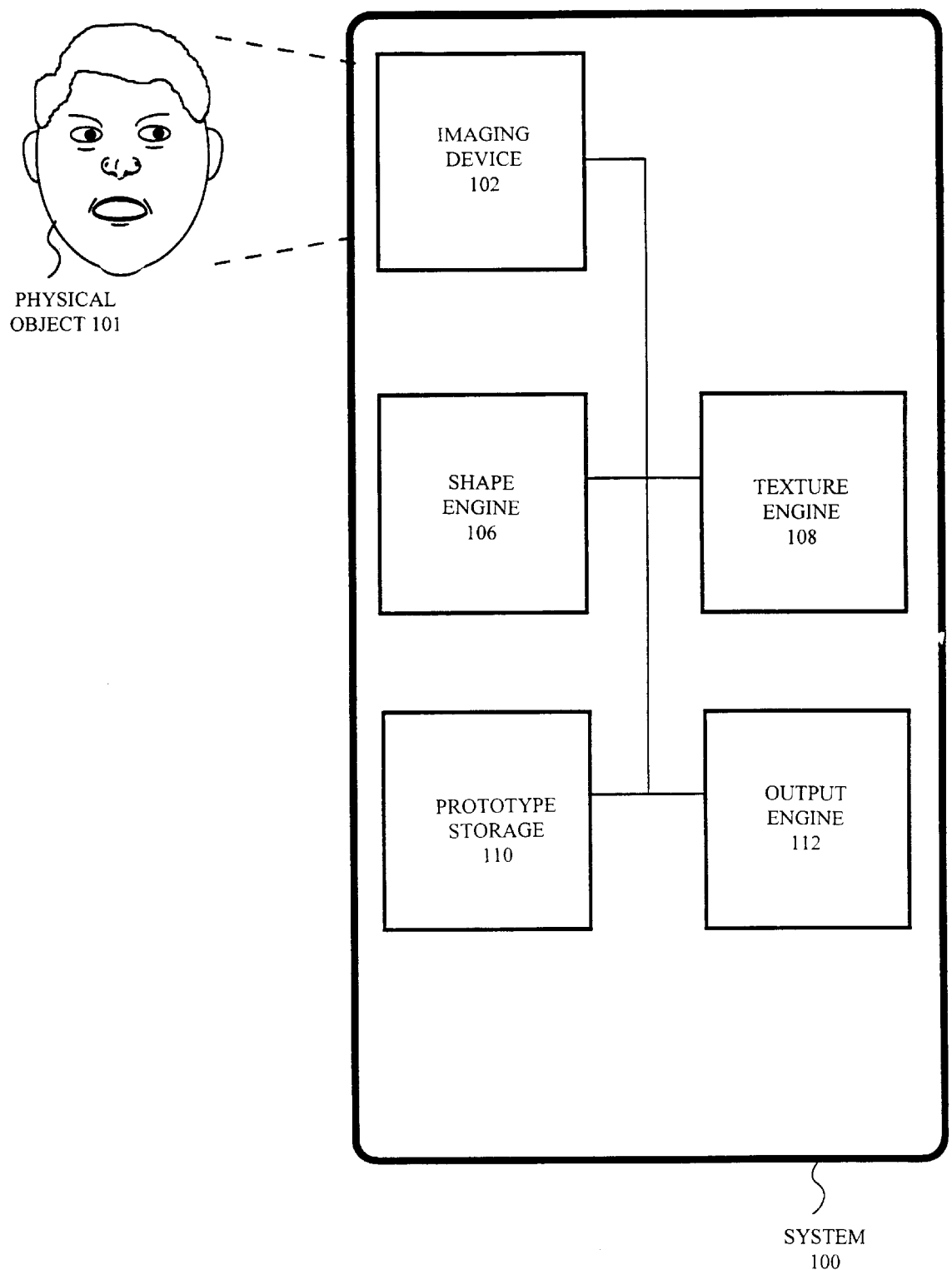
FIG. 1 illustrates a system (100) for the analysis and synthesis of images, in accordance with the present invention.

Referring now to FIG. 1, there is shown a system 100 for analyzing and synthesizing images in accordance with the present invention. System 100 as described herein may also be used for detecting and characterizing images. The primary components of system 100 include an imaging device 102, a shape engine 106, a texture engine 108, prototype storage 110, and an output engine 112.

Briefly, in operation imaging device 102 captures an image of a physical object 101, e.g., a human face, and converts the image into a signal suitable for processing. Shape engine 106 processes information regarding the shape of object 101. Texture engine 108 processes information regarding the texture of object 101. Prototype storage contains shape and/or texture information of prototype images for processing with shape and/or texture information from the shape engine 106 and/or the texture engine 108, together with flow fields containing prototype correspondences. Output engine 112 takes action as described below based on the processing of the previously mentioned subsystems 102, 106, 108, and 110.

As an example of one application of system 100, secured entry by authorized personnel only in a restricted area may be accomplished by using the output of system 100 to recognize the faces of authorized personnel, and by adapting output engine 112 to unlock an entryway only upon detection and recognition of such authorized personnel.

The various subsystems of system 100 may be implemented by a variety of combinations of dedicated circuitry and programmed general purpose computer circuitry. In a preferred embodiment, shape engine 106 and texture engine 108 are implemented by trained networks implemented by a programmed general-purpose computer. Each subsystem of system 100 will be discussed in turn.

Imaging device 102 is configured to produce a signal, typically in digital electronic form, corresponding to an image of a physical object 101. In one embodiment, imaging device 102 is implemented using a digital video camera. In another embodiment particularly suited to processing printed or photographic objects, imaging device 102 is implemented using a digital scanner. In accordance with the present invention, virtually any means of obtaining a signal representing a physical object may be used for imaging device 102.

Figure 2:
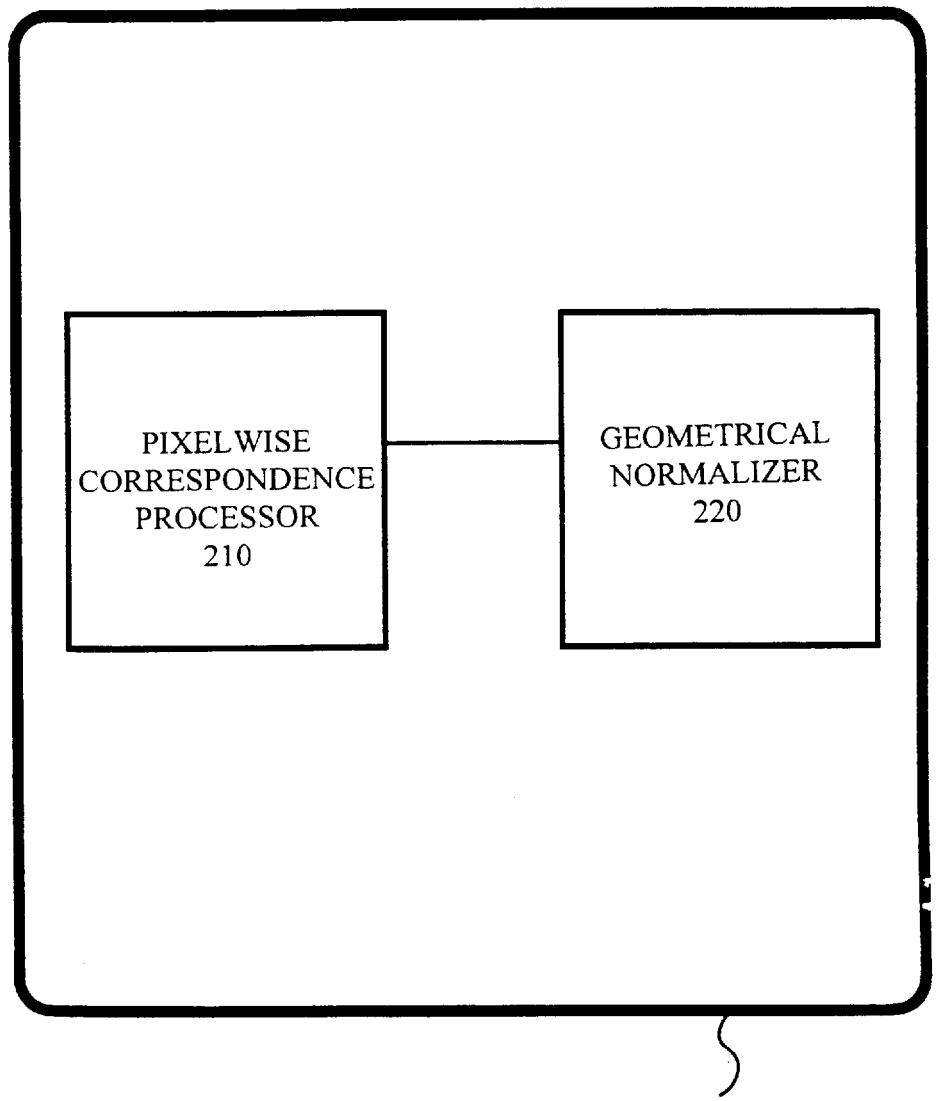
FIG. 2 illustrates a shape engine (106) in accordance with the present invention.

Shape engine 106 is used to process information pertaining to the shape of physical object 101. One embodiment of shape engine 106 is shown in greater detail in FIG. 2. Referring now to FIG. 2, shape engine 106 includes a pixelwise correspondence processor 210, implemented through an optical flow matcher or a model-based matcher as described below, and a geometrical normalizer 220 to warp an applied image to a standardized shape. Shape engine 106 produces a preprocessed signal from the signal provided by imaging device 102 by filtering and normalization operations discussed below.

Figure 3:
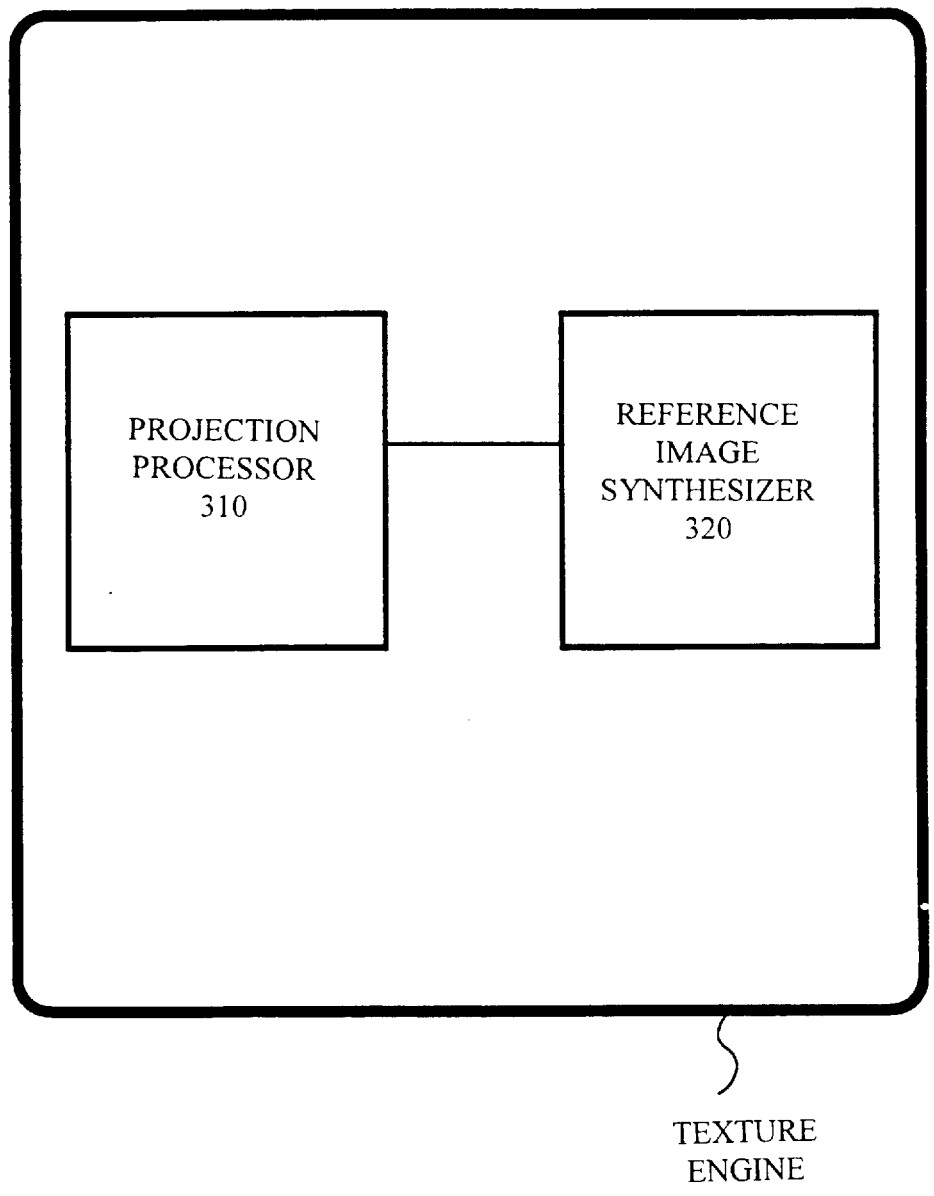
FIG. 3 illustrates a texture engine (108) in accordance with the present invention.

Texture engine 108 is used to process information pertaining to the texture (e.g., color or gray level attributes) of physical object 101. One embodiment of texture engine 108 is shown in greater detail in FIG. 3. Referring now to FIG. 3, texture engine 108 includes a projection processor to find linear texture coefficients by projecting geometrically normalized images onto example images, and a reference image synthesizer 320 to construct a reference image for shape engine 106, using linear texture coefficients.

System 100 is configurable for operation in three modes that will be discussed in greater detail herein: (I) as a device to analyze texture-free objects (e.g., line drawings or objects such as wire molds that define a form but are essentially texture-free) using an example-based approach, (II) as a device to analyze objects using an example-based approach for both texture and shape, and (III) as a device to analyze objects using a flow-based approach for shape and an example-based approach for texture.

Mode I: Example-Based Approach to Shape (Texture Ignored)

Turning now to Mode I, for many applications in which it is desired to match a perceived physical object, e.g., the visually perceived image of a human face, with one of a set of known templates, some prior knowledge is available about the contents of such images. For example, it is generally safe to assume that two frontal images of a human face will each include eyes, a nose, and a mouth. By taking advantage of these known features, image analysis may often be greatly facilitated. In a simplified case where the objects to be analyzed are line drawings, wire frames, or other objects with shape but no texture, particular benefits may be achieved.

Specifically, by establishing a pixel-by-pixel correspondence between two line drawings, certain information relating one drawing to the other may be determined.

Known systems exist for building "Active Shape Models" or ASMs. In such systems, a number of control points are identified on a first instance of a class of objects and then the same control points are identified on various images of that object class that represent how instances of the object class vary. A principal component analysis is then done on a matrix that consists of vectors of the control points. This principal components analysis yields a set of eigenvectors which describe the directions (in "control point space") of greatest variation along which the control points change. An ASM is the linear combination of eigenvectors plus parameters for translation, rotation, and scaling. Once the ASM is created, a novel object is matched to the ASM by using known techniques, e.g., "Cootes' algorithm," that adjust the settings of the ASM parameters such that the control points move toward edges in the novel image.

Figure 4:
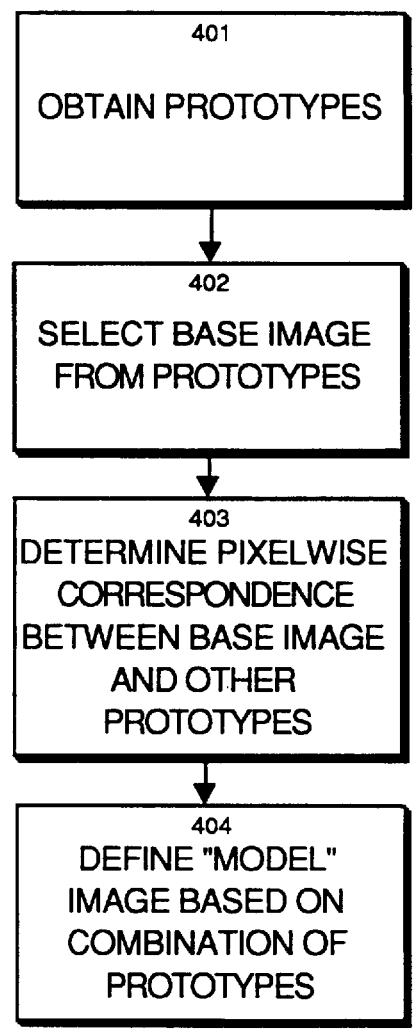
FIG. 4 illustrates a flow diagram of network training for operation of system 100 in Modes I and II in accordance with the present invention.

In accordance with the present invention, shape engine 106 implements a modified type of active shape model to achieve shape analysis. Referring now to FIG. 4, there is shown a flow diagram for shape engine 106 to learn a model, in accordance with the present invention.

Initially, shape engine 106 obtains 401 a number of two-dimensional prototypes. These prototypes may be of different objects, such as different human faces, or may be of the same object showing changes in the object. These changes may be due to the fact that the object is three-dimensional but the prototype is two-dimensional. For example, a three-dimensional object will provide different two-dimensional prototypes if it is rotated relative to an observer, subjected to translational movement relative to an observer, or moved loser to or further from the observer. Other objects may undergo inherent transformations. For example, a human face object may transform from a frown to a smile.

Once prototypes are obtained 401, one of the prototypes is selected 402 to be the "base" image with which the other prototypes are compared. In practice, it is found that best results are achieved if the base image selected contains primarily average, rather than extreme features, but any of the prototypes may be chosen as the base image. 10 Next, a pixel-by-pixel (alternatively denoted as "pixelwise" or "pointwise") correspondence between each pixel in each prototype image and a corresponding pixel in the base image is obtained. This may be performed in a conventional manner that uses a combination of known manual and automatic techniques. In a preferred embodiment, a small number of control points are manually determined, from which other points may automatically be assigned. For example, if the images are of a human face, a user may select control points by placing a display cursor over the corners of the eyes and mouth, the centers of the pupils, and the lowest point on the earlobes, and clicking a mouse button at each such location. Known techniques may then be used to develop a correspondence between each pixel of the image under study and the base image. Further details concerning techniques for obtaining such pixelwise correspondences may be found in T. Beier and S. Neely, *Feature-Based Image Metamorphosis*, SIGGRAPH '92 PROCEEDINGS, the Association for Computing Machinery, Chicago, ILL. 1992, pp. 35–42, the teachings of which are incorporated herein by reference.

The correspondences thus determined may be represented as vectors of points, or corresponding matrices. In a preferred embodiment, each prototype is represented as two matrices. A first matrix includes the horizontal displacement from each point in the base image to the corresponding point in the prototype. A second matrix includes the vertical displacement from each point in the base image to the corresponding point in the prototype.

Learning of a model is completed by defining 404 a "model" image based on a combination of the prototypes. Since each prototype has now been characterized as a vector, the model may similarly be characterized as a combination of the vectors representing the prototypes. Provision is also made for an affine transformation in characterizing the model, as discussed in greater detail below. Thus, shape engine 106 creates a model that is extremely flexible in that it is comprised of varying contributions, as desired, of prototypes and shifts in location or size, again as desired, to provide for affine transformations. As with the prototypes, the model is represented by a first matrix indicating horizontal displacement from each point in the base image to the corresponding point in the model, and by a second matrix indicating the vertical displacement from each point in the base image to the corresponding point in the model.

Symbols may be used to describe the operations performed by shape engine 106. If there are N prototype images, each one called $I_i$, the matrix of horizontal displacements for that image may be called $Dx_i$ and the matrix of vertical displacements for that image may be called $Dy_i$. The matrixes characterizing the model image, $Dx'$ and $Dy'$ for the horizontal and vertical displacements, respectively, may then be described as the combination of the prototype matrices, symbolically:

$$Dx' = \sum_{i}^{N-1} (c_i Dx_i)$$

$$Dy' = \sum_{i}^{N-1} (c_i Dy_i)$$

If affine transformations are to be provided for, then the model image may be described symbolically as:

$$Dx' = \sum_{i}^{N-1} (c_i Dx_i) + p_0 X + p_1 Y + p_2$$

$$Dy' = \sum_{i}^{N-1} (c_i Dy_i) + p_3 X + p_4 Y + p_5$$

where X and Y are matrices of constants and p0–p5 are other constants that together provide any desired affine transformation. In a preferred embodiment, each row of the constant matrix X is $(-w/2, -w/2+1, \ldots, -1, 0, 1, w/2-1, w/2)$ where w is the width, in pixels, of the prototypes. Similarly, each column of the constant matrix Y is $(-h/2, -h/2+1, \ldots, -1, 0, 1, h/2-1, h/2)^T$ where h is the height, in pixels, of the prototypes.

Figure 5:
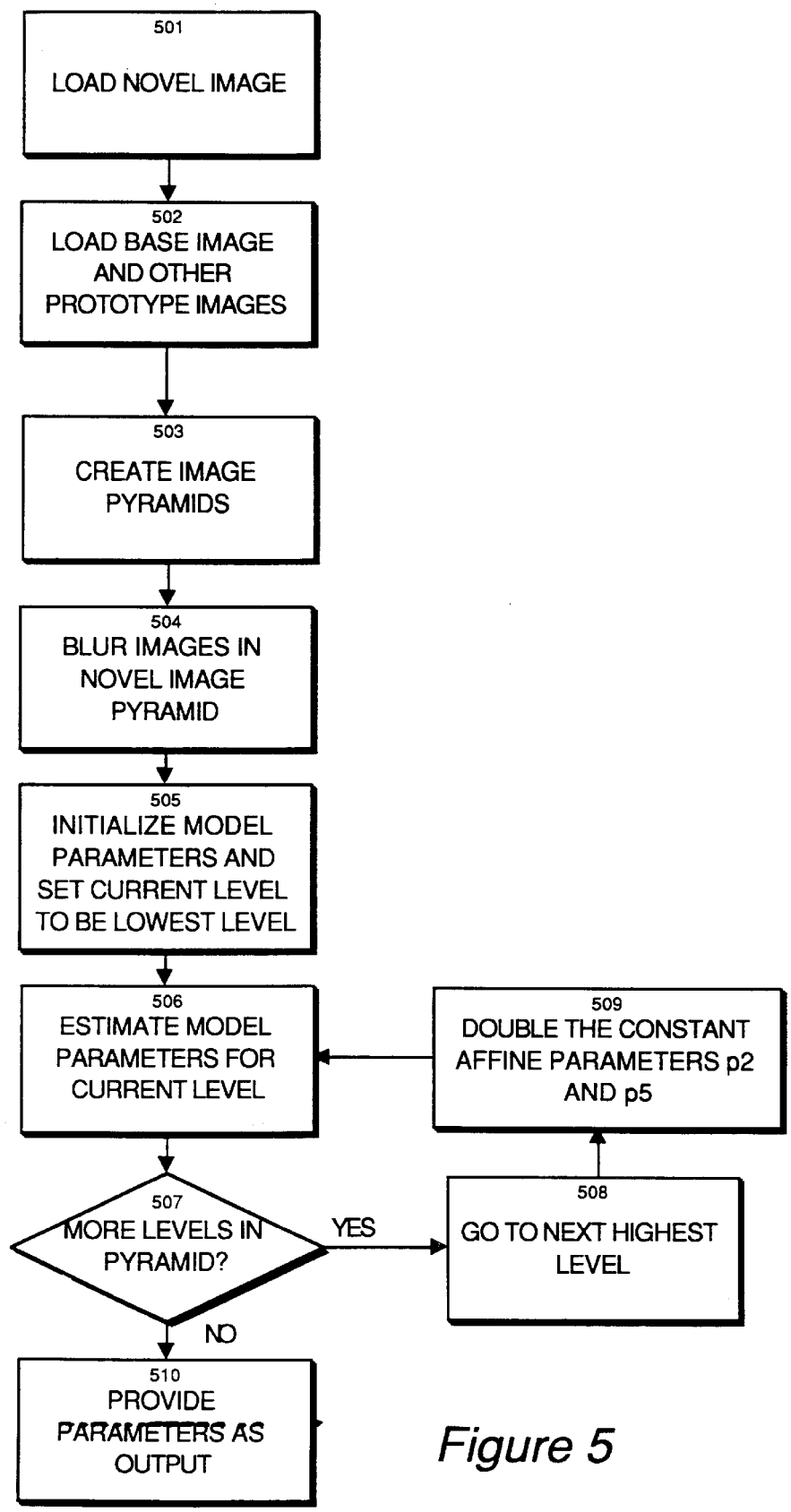
FIG. 5 illustrates a flow diagram of run-time processing for operation of system 100 in Modes I and II in accordance with the present invention.

Once shape engine 106 has learned a model as described in connection with FIG. 4, shape engine 106 is capable of analyzing novel objects based on the learned model. Referring now to FIG. 5, there is shown a flow diagram indicating such processing.

At a general level, shape engine 106 attempts to determine the values for parameters c $C_i$ and $p_i$ that create an approximated image most closely resembling the novel image being analyzed. If this goal can be successfully achieved, then the novel image may be easily reproduced by system 100, and stored, transmitted, or otherwise processed based only on the parameters rather than on detailed information about each of the pixels comprising the novel image. Furthermore, recognition of the image may be performed based on the parameters. The strategy employed by shape engine 106 is to make a guess at parameters that might yield a close resemblance between the model image and the novel image, define an error between them, and iterate this process based on the results in order to minimize the error.

In accordance with the present invention, the error is defined as the sum of squared differences over all pixels in the images, and this error is minimized using the Levenberg-Marquardt algorithm that is disclosed, eg., in W. H. Press, et al., NUMERICAL RECIPES IN C: THE ART OF SCIENTIFIC COMPUTING, Cambridge University Press, Cambridge, England, second edition (1992). It should be recognized that other error definitions and minimization techniques could also be used. For instance, stochastic gradient descent can also be used.

In practice, minimization as set forth above works well when initial model parameters are relatively close to the optimal parameters, but fails when the initial parameters differ significantly from the optimal ones. To improve performance in such instances, several known techniques may be employed. First, the black portions of the line drawings are blurred by known techniques that darken nearby white pixels of the line drawing. The blurred drawings are found to make the minimization more robust in that successful minimization may be achieved with initial parameters much further from optimal ones than would be possible in the non-blurred case.

A second technique found to be useful is minimization using a coarse-to-fine approach, as is sometimes employed in computer vision tasks. See, e.g., P. J. Burt, *The Pyramid as a Structure for Efficient Computation*, in MULTI-RESOLUTION IMAGE PROCESSING AND ANALYSIS, Rosenfield, ed., Springer-Verlag (1984), pp. 6–37. This technique involves creating a pyramid of images with each higher level of the pyramid containing an image that is one-fourth the size of the image below. After smoothing the image, the quarter-size images are obtained by taking every other pixel horizontally, and every other line vertically, from the image in the level below. Only those pixel flows corresponding to the remaining pixels need be considered, and so the pixel displacement matrices are subsampled accordingly, and horizontal and vertical displacements are also divided by two to account for the smaller dimensions. The minimization process described above may then be applied at the coarsest level (i.e., to the image level having the fewest pixels) to obtain a new estimate of the parameters, which may then be used as the initial parameters for the next level, and so on until the full-sized image has been processed.

In practice, it is found that the blurring and coarse-to-fine approaches usually allow for successful matching regardless of the initial parameter settings.

Turning now to run-time processing incorporating these techniques, the process illustrated in FIG. 5 begins by loading 501 a novel image, a base image 10 and other prototype images, and flow fields holding correspondences between prototype images, into shape engine 106. Pyramids as described above are created 503 from each of the loaded images. Each of the novel image representations in the novel image pyramid is blurred 504 as described above. Model parameters are then initialized 505 for the most coarse model image in the model image pyramid, and the current level is set to be the most coarse level. In a preferred embodiment, all parameters are simply set to zero at this stage (making the base prototype the starting point). Next, model parameters are estimated for the current level, using the Levenberg-Marquardt procedure discussed above or an equivalent, for instance stochastic gradient descent. More specifically, a model image is created by warping the base image according to the weighted sum of prototype flow fields plus an affine transformation, using the current guess for the model parameters. The model image is then blurred and the error between the blurred model image and the blurred novel image is computed. The known Levenberg-Marquardt algorithm is then used to find the optimal model 25 parameters that minimize the error between model and novel images. A check 507 is then made to determine whether there are more levels in the pyramid. If so, the next level is considered 508, the constant affine parameters $P_2$ and $p_5$ are doubled 509 to account for the change in size between the current level and the previous level, and processing returns to 506 to again estimate model parameters. Processing continues to iterate in this manner until check 507 results in a determination that there are no more levels in the pyramid. At that point, the current estimated parameters are provided 510 as output.

Although the affine parameters $p_0$–$p_5$ provide significant flexibility for handling global changes in rotation, size, and translation of an image, they do not provide the same flexibility where there are changes to only a portion of an image. Such componentwise changes may be handled by parsing an image into its constituent components, and then performing processing as described above on each of those components. For example, an image of a face might be decomposed into eye, nose, and mouth components. A new componentwise model can then readily be formed by a linear combination of location vectors for each component as well as a linear combination of individual component prototypes.

Mode II: Example-Based Approach to Both Shape and Texture

Most objects and images in the real world have both shape and texture. In order to model such objects without ignoring texture, some way to characterize the texture of a novel image being analyzed, or to create texture for a novel image to be synthesized, must be used. In many typical cases, good results may be obtained by using the same approach to texture as is used for shape in Mode I as described above: by approximating the novel texture as a linear combination of prototype textures.

In a preferred embodiment, the same coefficient vectors c and p are used to set pixel placements, and a new parameter vector b is added to provide for variations in pixel gray levels (or colors, if desired). Using a monochrome example for purposes of explanation, the position of a pixel i is determined by a linear combination of prototype positions as described in connection with Mode I, and the gray level value of pixel i is determined by a linear combination of prototype gray level values for i. The two linear combinations, for shape and texture respectively, use the same set of prototype images but two different sets of coefficients.

In a preferred embodiment, each prototype is thus represented as three matrices. A first matrix includes the horizontal displacement from each point in the base image to the corresponding point in the prototype. A second matrix includes the vertical displacement from each point in the base image to the corresponding point in the prototype. A third matrix includes the difference in gray level between each point in the base image and the corresponding base image.

Referring again to FIG. 4, learning of a model in Mode II involves obtaining 401 prototypes, selecting 402 a base image from the prototypes, determining 403 a pixelwise correspondence between the base image and the other prototypes, and defining 404 a model based on a combination of the prototypes. In Mode II, the model includes pixel gray level information in addition to pixel displacement information. Thus, shape engine 106 and texture engine 108 perform very similar tasks and, in implementation, may be merged in this mode of operation.

As with the prototypes, the model is represented by a first matrix indicating horizontal displacement from each point in the base image to the corresponding point in the model, by a second matrix indicating the vertical displacement from each point in the base image to the corresponding point in the model, and by a third matrix indicating difference in gray level image for each point in the model image with respect to the corresponding point in the model.

After learning of a model, the same type of processing as described in connection with FIG. 5 for Mode I may be performed in Mode II to match a novel gray level image to linear combinations of the prototypes. Rather than using only coefficient vectors c and p, however, the third coefficient vector b representing gray levels is also used.

Mode II operation of system 100 can be applied to numerous practical imaging problems. For example, it may be possible to establish correspondences between parameter values and certain image characteristics, eg., whether a human face is smiling or frowning, or whether a eyes are looking toward the left or toward the right. With such correspondences established, actions based on predetermined image characteristics may be performed by output engine 112. As a specific example, if a camera is aimed at a user of a "heads up" avionics display, a portion of the display may be illuminated more brightly in response to a determination that the user is looking at that portion of the display.

Mode III: Flow-Based Approach to Shape and Example-Based Approach to Texture

Mode III operation of system 100 provides an alternate manner of modeling shape to that described in connection with Mode II. In Mode III processing, the tasks of modeling shape and texture are performed iteratively in a manner that, in practice, is beneficial to both shape modeling and texture modeling. In short, texture information can be helpful in performing shape analysis and shape information can be helpful in performing texture analysis, so that if the processing for shape and texture are interleaved, results are obtained more quickly and efficiently than otherwise would be possible.

The shape modeling used in Mode III is based on conventional optical flow techniques that compute pixelwise correspondences between a reference image and a novel input image. Texture modeling is performed in one embodiment in the manner set forth in connection with Mode II, but may also be performed using other techniques. In a preferred embodiment, the "eigenimages" of the prototypes rather than the prototypes themselves are linearly combined to model texture, as will be detailed below.

As with Modes I and II, Mode III involves two main parts: network learning and run-time operation.

Figure 6:
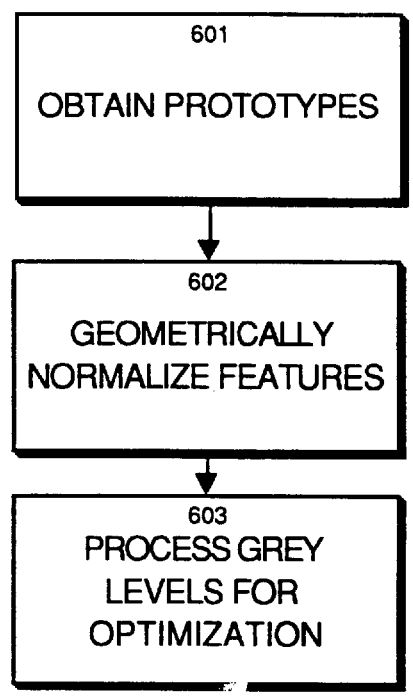
FIG. 6 illustrates a flow diagram of network training for operation of system 100 in Mode III in accordance with the present invention.

Referring now to FIG. 6, there is shown a flow diagram of processing for learning in connection with Mode III operation of system 100. As with the other modes, learning commences by obtaining 601 a set of prototypes. A modeling assumption used in both Mode II and Mode III operation is that the texture approximations that are likely to be called for, either in analysis of novel input textures or in synthesis of novel textures, are within a space of textures that may be linearly spanned by the textures in the set of prototypes. Accordingly, the prototypes should provide representative textures sufficient to define a "texture space" within which novel textures may be approximated.

Figure 7:
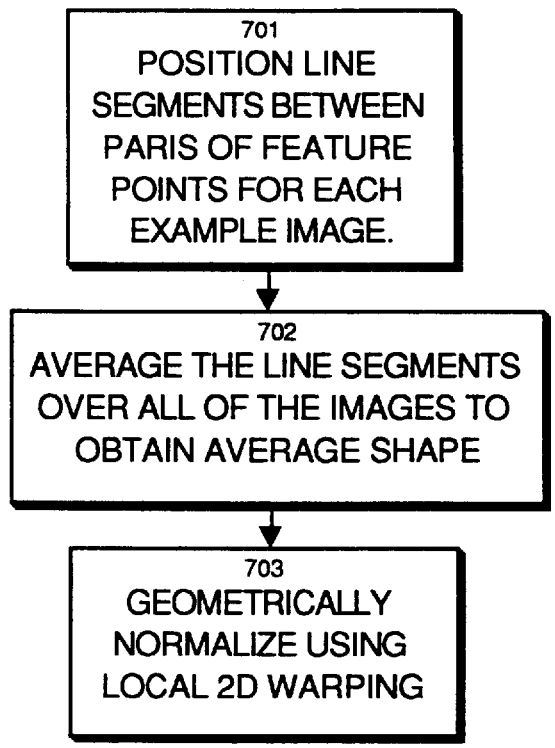
FIG. 7 illustrates a flow diagram detailing geometrical normalization processing of FIG. 6.
Figure 8:
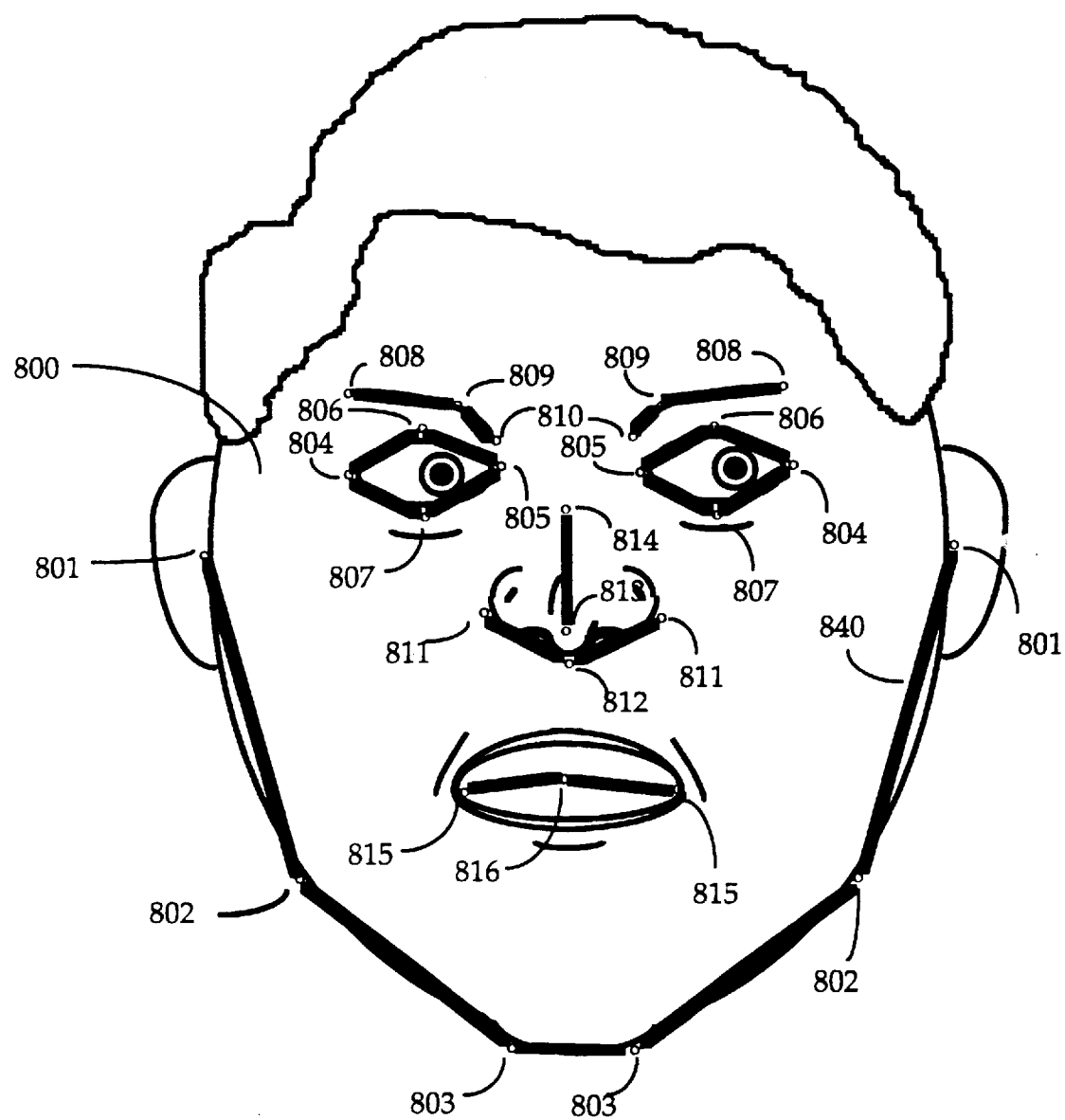
FIG. 8 illustrates use of feature points and line segments for geometrical normalization in accordance with the present invention.

Once a set of prototypes is obtained 601, features of the prototypes are geometrically normalized 602. Taking as an example an application where the prototypes are images of human faces, this geometric normalization involves warping each prototype face to a standard geometry. The details of how this is done are illustrated in FIGS. 7 and 8. Referring now to FIG. 7, normalization begins in a preferred embodiment by positioning 701 line segments between pairs of feature points in each prototype image. In a preferred embodiment, this task is performed by using a pointing device (e.g., mouse or digitizing tablet) to select pairs of image features, between which a line segment is created using conventional computer-assisted design tools. Still using the example of an image of a face, and referring now also to FIG. 8, feature points of a face 800 in a preferred embodiment are the outer and inner edges of the eyebrows 808, 810, the apex of curve of the eyebrows 809, the upper, lower, left-most and right-most points of the eyes 804–807, the root of the nose 814, the tip of the nose 813, the point where the philtrum meets the nose 812, the outermost portions of the nose 811, the center of the mouth 816, the edges of the mouth 815, the ears 801 , the apexes of curvature of the jowls 802, and the apexes of curvature of the chin 803. In a preferred embodiment, line segments, e.g., 840, are defined between selected pairs of points 801–816 as illustrated in FIG. 8. It should be recognized that known edge detection and other image processing techniques could also be applied to automate the task of assigning feature points 801–817 and creating line segments, e.g., 840. The use of line segments provides control over local scale and rotation, as discussed in more detail below. Features in each prototype image are defined in the same manner so that feature correspondence among prototypes can be made.

Next, the line segments so created are averaged 702 over all of the prototype images to define a model shape. Although a model shape could be defined in another manner, e.g., by simply picking one of the prototypes to be the model, in practice it is found that using an average shape typically minimizes the total amount of distortion needed for subsequent geometrical normalization 703.

Geometric normalization 703 involves pairing line segments in each prototype with corresponding segments in the model. As an overview, geometrical normalization is performed by comparing line segments from a prototype with corresponding segments from a model, determining a local transform for the image portions surrounding such corresponding segments, and taking a distance-weighted average of the transforms from each such line segment pairing to obtain an overall transform, or warp, from the prototype to the model. Details of such geometric normalization are well known, and are described, for example, in the Beier and Neely artide incorporated by reference above.

Referring again to FIG. 6, once the prototypes have been geometrically normalized 602 for shape, they are used for texture modeling. Specifically, textual information in the form of gray levels is processed 603 to optimize later run-time texture analysis, which models an input texture as a linear combination of prototype textures, as described in connection with Mode II. To facilitate such later analysis, texture information from the prototypes is represented in matrix form. For the case where novel textures will be represented directly as linear combinations of prototype textures, a two dimensional matrix T is formed, the columns of which represent each prototype (after normalization 602) and the rows of which represent individual pixels, and each entry of which represents the texture (i.e., gray value) of a particular pixel in a particular prototype. It is found that later run-time processing is facilitated by performing texture analysis (as described below) using another matrix, T+, that is a pseudoinverse of T. T+ is obtained from T by first multiplying T by its transpose, taking the inverse of the result and multiplying that inverse by the transpose of T. Symbolically, this is shown as:

$$T^+ = (T^t T)^{-1} T^t$$

Rather than using linear combinations of the prototypes themselves for texture information, certain advantages may be realized by using linear combinations of "principal components" of the prototypes. In principal components analysis, the eigenvalues and eigenvectors (or "eigenimages") of a covariance matrix of prototypes are determined using known techniques, such as described in M. Turk and A. Pentland, *Eigenfaces for Recognition*, JOURNAL OF COGNITIVE NEUROSCIENCE 3(1):71–86, 1991, the contents of which are incorporated herein by reference. The prototype eigenimages, rather than the prototypes themselves, may then be used as prototypes. In practice, it is found that only a subset of the prototype images need be used to obtain good results. In a preferred embodiment, eigenimage prototypes constructed using the Turk/Pentland technique are used rather than the prototypes themselves, and only about half of the eigenimage prototypes so produced are used. One of the characteristics of eigenimages produced in this manner is that they are orthogonal and may readily be normalized to be orthonormal. These characteristics are found to facilitate analysis during run-time and reduce the number of eigenimage prototypes needed for good results. It should be recognized that other types of gray level processing 603 could also be used during learning to optimize subsequent run-time processing. As one further example, the process known as Gram-Schmidt orthonormalization could also be applied to the prototypes, and the prototypes so processed could be used instead of the unprocessed prototypes.

Figure 9:
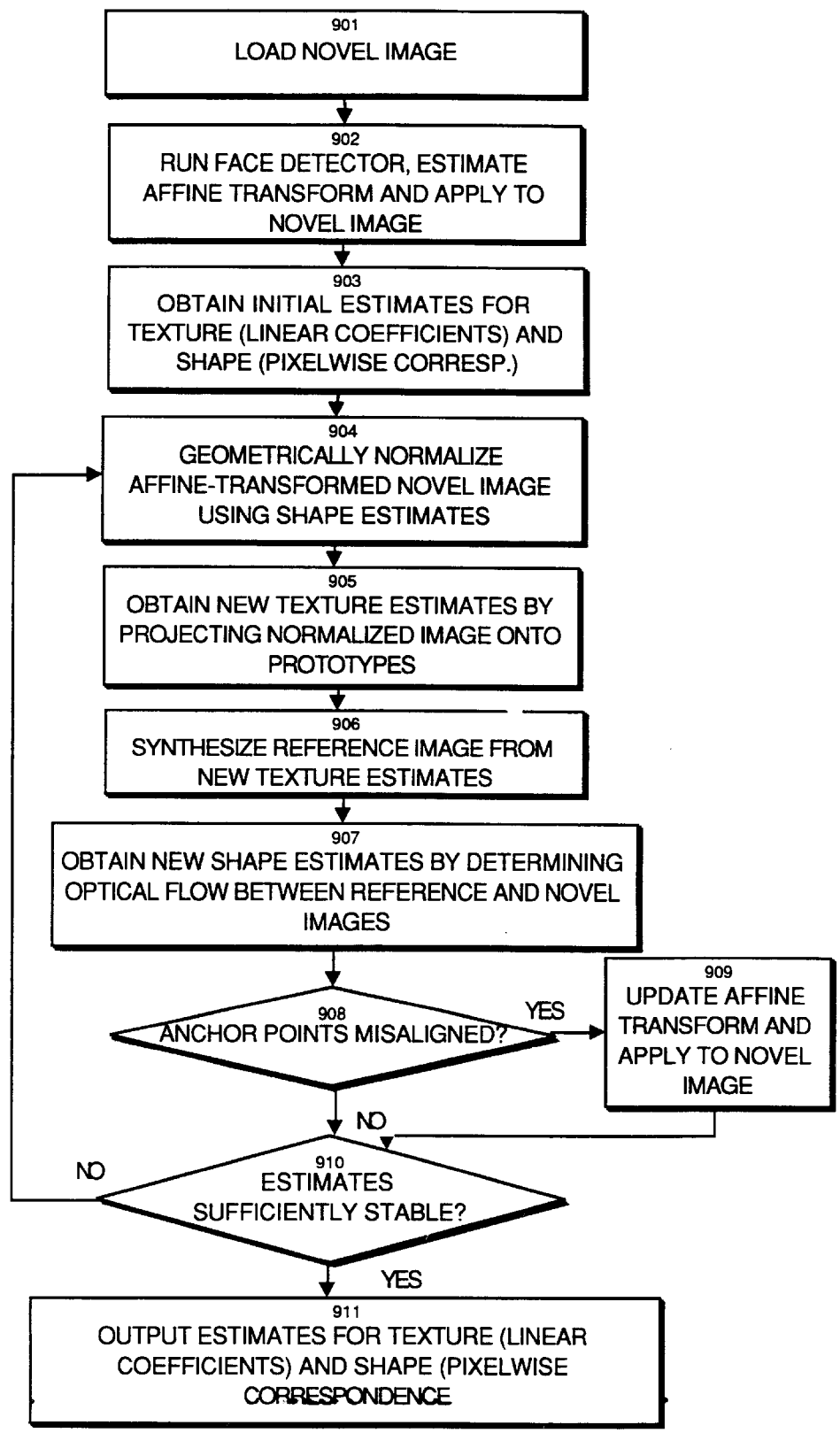
FIG. 9 illustrates a flow diagram of run-time processing for operation of system 100 in Mode III in accordance with the present invention.

Referring now to FIG. 9, there is shown a flow diagram of run-time processing in accordance with Mode III operation of system 100. The flow diagram of FIG. 9 is directed toward a particular application of analyzing a novel input image of a human face, and uses eigenimages as prototypes as discussed in connection with FIG. 6 above. As with Modes I and II, processing commences by loading 901 a novel image to be analyzed. Next, a face detector operation is run 902 to isolate the portion of the image that represents a face and to provide initial alignment prior to further processing. In a preferred embodiment, standard correlation is used to identify that portion of the novel image that is a face.

Face detector processing 902 also includes alignment of the detected face, to facilitate further processing. Because geometry and correspondence are key factors used in analysis by system 100, performance can be expected to degrade as the pose or size of a face in a novel image deviates from that found in the prototypes. Several methods may be employed to handle the problem of varying poses. First, prototypes representative of each expected pose may be included in the prototype set. This approach has the undesirable characteristic of making subsequent analysis processing significantly more complex and time-consuming. Another approach is to apply an affine transformation to the input image, as described in connection with Mode I operation of system 100. In a preferred embodiment, a six-parameter affine transform p is used in connection with Mode III operation of system 100 to address the difficulties of varying poses. Symbolically, if the novel input image is represented by t(x,y), then the affine- transformed image, t'(x,y), is given by:

$$t'(x,y)=t(p_0 x+p_1 y+p_2, p_3 x+p_4 y+p_5)$$

The transform p can be defined by one, two or three "anchor points", depending on whether the transform is to account for translation only; translation, scaling, and image plane rotation; or full affine transformation including image shear, respectively. In a preferred embodiment only one or two anchor points are used, as full affine transformation need not be considered. Continuing with the current example of processing human face images, both irises are used as anchor points in the preferred embodiment.

Once face detector processing is run 902, initial estimates are obtained 902 for both texture and shape. In Mode III, texture is approximated by linear combinations of prototypes, so texture estimates are the coefficients of such linear combinations (as in Mode II). In Mode III, shape is approximated by optical flow, and is characterized in the conventional manner by pixelwise correspondences that are matrices of horizontal and vertical displacements from a reference image, for each pixel of the novel image. In a preferred embodiment, all of these estimates are initially set 903 to zero;

Next, the affine-transformed novel image is geometrically normalized 904 as described above, using the current shape estimates. New texture estimates are then obtained 905 by projecting the normalized novel image onto the prototype textures, implemented in a preferred embodiment by subtracting off a mean prototype and determining a dot product with each eigenimage.

These new texture estimates are then used to synthesize 906 a reference image by applying the linear coefficients to the prototypes using the T matrix discussed in connection with the learning processing shown in FIG. 6, with the modification that the prototype textures are replaced by eigenimages such as eigenfaces. Specifically, if the linear coefficients are assembled into a vector b, then the new reference image is obtained by multiplying the matrix T by the vector b and adding the mean prototype texture image.

New shape estimates are then obtained 907 by determining optical flow between the reference image just created and the affine-transformed novel input image. The known Bergen-Hingorani technique described, for example, in J. R. Bergen and H. Hingorani, *Hierarchical Motion-Based Frame Rate Conversion*, (published technical report), David Sarnoff Research Center, Princeton, N.J. Apr. 1990, the teachings of which are incorporated herein by reference, is used in a preferred embodiment for this optical flow determination, but other techniques may be used.

The new optical flow indicates whether there is misalignment of the anchor points in the reference image compared with the input image. Misalignment is indicated by non-zero optical flow at the anchor points in the reference image. A check 910 is made to determine whether the anchor points are misaligned. If so, the affine transform p is updated using the new anchor point correspondences indicated by optical flow and again applied 909 to the novel input image. Either way, a check 910 is then made to determine whether the estimates for shape and texture are sufficiently stable, i.e., do not vary substantially from the previous estimates, that further processing is not needed. If the estimates are sufficiently stable, the current estimates for texture (linear coefficients) and shape (pixelwise correspondences) are sent as output 911, and analysis is complete. Otherwise, processing returns to geometrical normalization 904, this time using the latest shape estimates, and processing iterates among steps 904–909 until the estimates become sufficiently stable.

It should be recognized that the processing order set forth in FIG. 9 may be significantly varied, and the alternation between use of shape estimates and texture estimates need not commence with the use of shape estimates as in FIG. 9 (specifically, the geometric normalization 904). For example, new texture estimates could be obtained, reference images could be synthesized, and new shape estimates could be obtained before geometric normalization.

As with operation under Modes I and II, Mode III operation may be made more robust by parsing prototypes and novel images into components and analyzing the components individually. In one embodiment, the eyes, the nose, and the mouth are treated as separate components. In this embodiment, the eyes component is processed first, using two iris features as anchor points for affine transform p, which provides a normalizing similarity transform for the face. A single anchor point is used for the nose and mouth, so that only translation is adjustable by transform p. By so fixing scale and rotation parameters for the nose and mouth, a harmless constraint is found to be imposed that has the advantage of reducing processing complexity.

Not only may novel images applied to system 100 be analyzed in Mode III, but Mode III processing may also be used to synthesize new images based on prototypes. In one application, for instance, it may be desirable to synthesize new "virtual" poses of a novel object based on a set of prototype poses. As used herein, the term "poses" includes not only traditional portrait perspectives such as full-face or profile, but also includes any generic transformation in an object from one image to another, for instance a 3D rotation, an illumination change, or a nonrigid linear transformation. Therefore, facial expressions (e.g., smiling, frowning) and even the apparent age of an object in an image (e.g., a young person's face, an old person's face) may provide exemplary "poses" for use in synthesizing a new image.

In conventional approaches, two-dimensional images are mapped onto a three-dimensional model to facilitate such synthesis. Such an approach is not needed for synthesis under Mode III operation, since prior knowledge of transformations such as change in pose may be extracted directly from prototypes and applied to the novel image. Thus, with only a single two-dimensional image of a novel object, a new virtual view of that object may be synthesized. Specifically, such synthesis uses sets of images showing prototypes after specific changes in pose. Correspondences for each set of these prototype images are determined as described above. Analysis of a new image I as described above by the set of prototypes yields coefficients $b_i$ for the linear approximation of the new texture of I through the prototypical textures and $c_i$ for the linear approximation of the shape of I through the prototypical shapes. A new synthetic image is created of the object displayed in image I by use of these coefficients $bi$ and $ci$. In particular, such a synthetic image is generated by forming a linear combination of the textures, and forming a linear combination of the shapes, of one of the other sets of transformed prototypes, using $b_i$ and $c_i$ as coefficients. The synthesized image thus shows the input image I transformed in the same manner as the prototypes.

It should be recognized that although the discussion above has focused on images of human faces, the system and method of the present invention readily may be applied to many other classes of objects as well.

Therefore, image analysis is achieved by learning and processing models based on shape and texture. The above description is included to illustrate the operation of preferred embodiments and is not meant to limit the scope of the invention. The scope of the invention is to be limited only by the following claims. From the above discussion, many variations will be apparent to those skilled in the art that would yet be encompassed by the spirit and scope of the invention.

We claim:

1. A method of synthesizing and operating a network to characterize a new physical image relative to a plurality of prototypes, the prototypes having shapes but no texture, the process comprising:
    (a) synthesizing the network by:
        (i) determining pointwise prototype correspondences among the plurality of prototypes;
        (ii) creating a model responsive to the pointwise prototype correspondences, the model being a parameterized pointwise weighted linear combination of the shapes of the prototypes;
    (b) operating the network by:
        (i) filtering and normalizing the new image;
        (ii) determining model parameters to iteratively minimize a pointwise distance metric from the new image to the model, the pointwise distance metric being responsive to shape, thereby establishing new image pointwise correspondences between the new image and each said prototype; and
        (iii) characterizing the new image by the model parameters and the new image pointwise correspondences.

2. A method of synthesizing and operating a network to characterize a new physical image relative to a plurality of prototypes, the prototypes having shapes and textures, the process comprising:
    (a) synthesizing the network by:
        (i) determining pointwise prototype correspondences among the plurality of prototypes;
        (ii) creating a model responsive to the pointwise prototype correspondences, the model being a parameterized pointwise weighted linear combination of the shapes and textures of the prototypes;
    (b) operating the network by:
        (i) filtering and normalizing the new image;
        (ii) determining model parameters to iteratively minimize a pointwise distance metric from the new image to the model, the pointwise distance metric being responsive to shape and texture, thereby establishing new image pointwise correspondences between the new image and each said prototype; and
        (iii) characterizing the new image by the model parameters and the new image pointwise correspondences.

3. A method of synthesizing and operating a network to characterize a new physical image having shape and texture relative to a plurality of prototypes, the prototypes also having shapes and textures, the process comprising:
    (a) synthesizing the network by:
        (i) determining pointwise prototype correspondences among the plurality of prototypes;
        (ii) creating a model as a linear combination of geometrically normalized textures derived from the prototypes, the model having a model shape;
    (b) operating the network by:
        (i) filtering and normalizing the new image;
        (ii) parameterizing the new image shape responsive to optical flow transformation of the new image shape to the model shape;
        (iii) parameterizing the new image texture responsive to pointwise combinations of the textures of the prototypes; and
        (iv) iterating (b)(ii) and (b)(iii).

4. A method of synthesizing and operating a network to create a novel physical image from an applied physical image having shape and texture relative to a plurality of prototypes, the prototypes also having shapes and textures, the applied physical image and the prototypes each corresponding to one of a plurality of poses, the process comprising:
    (a) synthesizing the network by:
        (i) determining pointwise prototype correspondences among the plurality of prototypes separately for each of said plurality of poses;
        (ii) creating a model as a linear combination of geometrically normalized textures derived from the prototypes for a first one of said plurality of poses;
    (b) operating the network by:
        (i) filtering and normalizing the applied physical image;
        (ii) parameterizing the applied physical image shape responsive to optical flow transformation of the applied image shape to the model shape;
        (iii) parameterizing the applied image texture responsive to pointwise combinations of the textures of the prototypes;

(iv) iterating (b)(ii) and (b)(iii); and (v) implementing a desired transformation of the applied physical image into the novel physical image by using parameters from the result of b(iv) applied to a subset of the prototypes associated with a desired second one of said plurality of poses.

5. An image processing system for characterizing an applied image of a physical object relative to a plurality of prototypes, the system comprising:

an imaging device for producing a signal responsive to the applied image;

a prototype storage device, the prototype storage device containing the plurality of prototypes;

a shape engine operatively connected to the imaging device and to the prototype storage device, the shape engine having a synthesis mode of determining pointwise prototype correspondence among the plurality of prototypes and creating a model responsive to the pointwise prototype correspondences, the shape engine further having an operating mode of filtering and normalizing the signal to produce a preprocessed signal, determining model parameters to minimize a pointwise distance metric from the applied image to the model responsive to the preprocessed signal, establishing pointwise correspondences responsive to the plurality of prototypes and the preprocessed signal; and an output engine operatively connected to the shape engine, the output engine producing output responsive to the model parameters and the pointwise correspondences.

6. A system as in claim 5, further comprising a texture engine, the texture engine cooperating with the shape engine to produce the model parameters.

7. A system as in claim 5, wherein the output is a novel representation of the physical object.

8. A system as in claim 5, wherein the output engine disengages access controls to a secured area responsive to predetermined characteristics of the model parameters and pointwise correspondences.

9. An image processing system for characterizing an applied image of a physical object relative to a plurality of prototypes, the system comprising:

an imaging device for producing a signal responsive to the applied image;

a prototype storage device, the prototype storage device containing the plurality of prototypes;

texture engine for processing texture information responsive to the signal;

a shape engine operatively connected to the imaging device, to the prototype storage device, and to the texture engine, the shape engine and the texture engine cooperating to provide a synthesis mode of determining pointwise prototype correspondences among the plurality of prototypes and creating a model responsive to linear combinations of geometrically normalized textures derived from the prototypes, the shape engine and the texture engine further cooperating to provide an operating mode of filtering and normalizing the signal to produce a preprocessed signal, and iteratively parameterizing image shape and texture responsive to the plurality of prototypes and the preprocessed signal; and an output engine operatively connected to the shape engine, the output engine producing output responsive to the model parameters and the pointwise correspondences.

10. A system as in claim 9, wherein the output is a novel representation of the physical object.

* * * * *